UNITED STATES PATENT OFFICE.

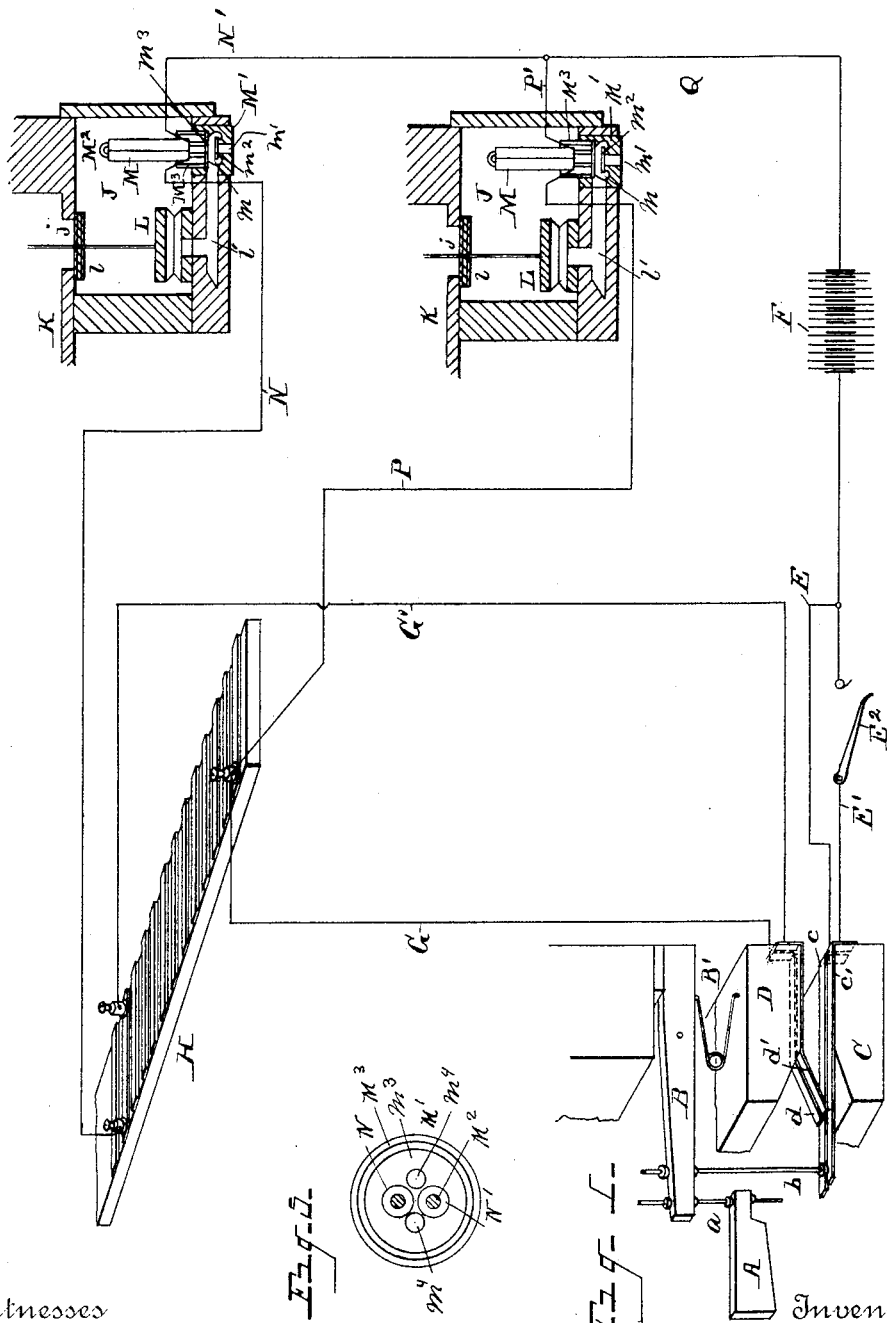

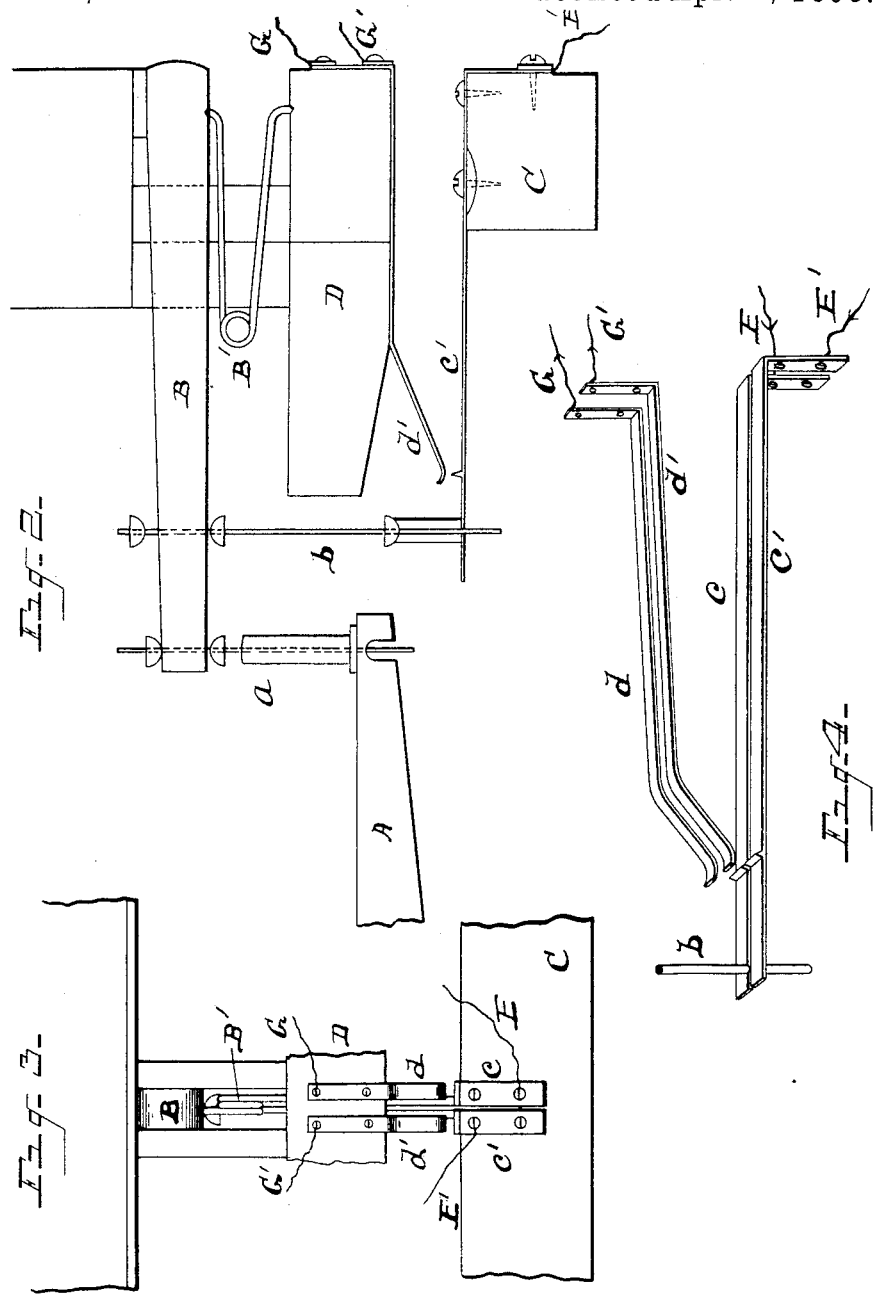

EDWIN S. VOTEY, OF DETROIT, MICHIGAN.

ELECTRIC ORGAN-COUPLING MECHANISM.

SPECIFICATION forming part of Letters Patent No. 536,974, dated April 2, 1895.

Application filed April 7, 1894. Serial No. 506,720. (No model.)

*To all whom it may concern:*

Be it known that I, EDWIN S. VOTEY, a citizen of the United States, residing at Detroit, county of Wayne, State of Michigan, have invented a certain new and useful Improvement in Organ-Coupling Mechanism; and I declare the following to be a full, clear, and exact description of the invention, such as will enable others skilled in the art to which it appertains to make and use the same, reference being had to the accompanying drawings, which form a part of this specification.

My invention has reference to an improved organ coupler mechanism, the same being designed more particularly to couple octave keys together, and it consists of the devices and appliances, their construction, combination and arrangement as more fully hereinafter described and claimed, and illustrated in the accompanying drawings, in which—

Figure 1 is a general diagram view illustrating my invention, showing parts in section and parts in perspective. Fig. 2 is a side elevation of the key contact mechanism. Fig. 3 is a rear elevation of the same; and Fig. 4 is a detail view of the contact springs and bars. Fig. 5 is a plan view of the magnet "M" showing the core in section.

I carry out my invention as follows:

"A" represents a key and B a lever connected therewith by a connecting rod "$a$."

"C" denotes a support upon which are engaged spring bars "$c$," "$c'$."

"D" is a support thereabove, upon which are engaged metallic contact bars "$d$" and "$d'$."

"B'" is a spring to restore the lever "B" to normal position.

The spring bars "$c$" and "$c'$" are connected with conductors "E" and "E'" connected with a battery or other electrical source of supply "F." The conductor "E" is the main line conductor, and the conductor "E'" we will call the octave or additional line conductor. Between the battery "F" and the spring bar "$c'$," with which the conductor "E'" is connected, is located any suitable switch, as at "$E^2$," Fig. 1, operated by a stop rod or otherwise, as may be desired, arranged to throw the conductor "E'" into complete circuit when desired. The bars "$d$," "$d'$" are connected with conductors "G," "G'" leading preferably to a junction board "H."

"J" denotes a fresh wind box communicating with a wind chamber or passage "K," as through an orifice "$j$," the passage or chamber "K" shown broken away and leading to pipes not shown.

In the fresh wind box "J" is located a pneumatic "L" operating a valve "$l$" controlling the orifice "$j$." In the base of said fresh wind box is a channel "$l'$" communicating with the interior of the fresh wind box "J" through an electro-magnet "M" the particular construction of which forms the subject matter of a separate application filed simultaneously herewith, Serial No. 506,715. This magnet consists essentially of a case constructed with a base "M'" provided with an orifice "$m$," opening into the passage "$l'$" and with a channel "$m'$" communicable with the channel "$m$." "$m^2$" is an armature controlling said communication.

"$M^2$" is the core of the magnet, the poles of which are united by a plate "$m^3$" held in place by a cap "$M^3$." The cap "$M^3$" and the plate "$m^3$" are constructed to admit the passage of wind from the fresh wind box "J" therethrough into the passage "$m$," "$l'$" and into the pneumatic to inflate it. The core of the magnet is wound with electrical conductors "N" and "N'". When said conductors are in electrical circuit, the armature "$m^2$" is attracted to the plate "$m^3$," closing communication between the fresh wind box "J" and the channel "$l'$" and opening communication through the channel "$l'$," "$m$" and "$m'$," allowing the pneumatic "L" to exhaust. The conductor "N," being the main line conductor, leads to the junction board H and also the conductor "N'."

It will be understood that my invention contemplates a series of pneumatics "L" in the fresh wind box "J," and also a series of magnets "M." To show how two octaves may be coupled by my invention I have shown in Fig. 1, in diagram, two corresponding pneumatics "L" in the wind box "J" with two magnets "M" to control the passage of wind to and from their respective pneumatics. The lower magnet shown in Fig. 1 is constructed similar to that already described and serves a similar purpose to govern the operation of the octave above or below that controlled by the upper magnet in Fig. 1. In actual arrangement these magnets might be in the same horizontal plane, but in the diagram view shown in Fig. 1, said magnets are separately shown to more clearly indicate their respective electrical connections. The core of the lower magnet is wound with conductors similar to the conductors "N" and "N'," but which for distinctness we will mark "P" and "P'." The conductor "P" leads to the junction board "H" and into electrical connection with the main wire "G," while the conductor "P'," together with the conductor "N'" of the upper magnet leads, as by a conductor "Q" back to the battery "F." When the key "A" is depressed the spring bars "c" and "c'" are raised into contact with the bars "d" and "d'."

We will now suppose the player desires only to play a single note upon the depression of the key "A." The switch "E²" is open. It will readily be seen that the spring bar "c" by the conductor "E" is connected with the battery "F." Electrical contact is also formed between the spring bar "c" and bar "d," thence through the conductor "G" to the junction board "H," thence through conductor "P" to the lower magnet "M," thence through the conductors "P'" and "Q" back to the battery "F." The electrical circuit is thus completed and the note corresponding to the main line connection will sound. The spring bar "c'" is, of course, also in contact with the bar "d'," but circuit is broken by the open switch "E²."

Now if the operator desires to play the octave together with the key corresponding to the main line connections above described, he closes the switch "E²" by any suitable mechanism and establishes an electrical circuit through the spring bar "c'" and conductor "E'" to the battery, also through the bar "d'," conductor "G'" to the junction board "H," thence through conductor "N" to the upper magnet "M" in Fig. 1, thence through the conductors "N'" and "Q" back to the battery and the octave key is sounded together with that corresponding to the main line connection.

I do not limit myself simply to the employment of two spring bars "c," "c'" with two bars "d," "d'" to form electrical contact therewith, as I contemplate any desired number of spring bars to be brought into contact with a corresponding number of bars "d," "d'," &c., as may be desired. Thus for example, if it were desired to play three octaves, three spring bars might be located upon the support "C" and three corresponding bars would be located upon the support "D" having similar electrical connections as those already described. I do not limit myself to this particular construction of the magnets "M," as any other form of magnet may be used, which will accomplish the same general purpose. There will be as many under spring bars, as upon a support "C," as there are contacts above them. In this manner I am enabled to make and break electrical connection of the battery wire with any desired number of couplers.

To provide communication between the fresh wind box "J" with the channel "l" through the magnet, the plate "m³" may be provided with perforations "m⁴."

It will be observed that the lever "B" is connected by a rod "b" with two spring bars "c" "c'," to bring both of the spring bars simultaneously into contact with the corresponding contact bars "d" "d'." It will be understood that the organ is provided with a series of spring bars "c" "c'" arranged in pairs corresponding to a desired number of keys, and with a series of contact bars "d" "d'" arranged in pairs corresponding to the pairs of spring bars, each pair of spring bars being simultaneously actuated by a corresponding key.

What I claim as my invention is—

1. In an organ coupler, a pair of spring bars "c" "c'," a battery, electrical conductors connecting each of said spring bars with the battery, a switch to open and close the circuit through one of said conductors, a corresponding pair of contact bars "d" "d'" provided with electrical conductors arranged to make connection with the battery, means of closing and breaking the circuit through the last named conductors, and key actuated means to simultaneously make and break electrical connection of each of said spring bars and its opposing contact bar when a given key is operated, substantially as described.

2. In an organ coupler, the combination of a pair of spring bars "c" "c'" a pair of contact bars "d" "d'," a battery, electrical conductors to independently connect each of the spring bars with the battery, a switch in one of said conductors, electrical conductors to independently connect the contact bars with the battery, and key actuated mechanism to electrically connect each of the spring bars and its opposing contact bar simultaneously with the operation of a given key, substantially as described.

3. In an organ coupler, the combination of spring bars "c" "c'" arranged in pairs, a battery, conductors "E" "E'" to electrically connect each pair of spring bars with the battery, a switch interposed into one of said conductors, contact bars "d" "d'" arranged by pairs, electro-magnets, electrical conductors connecting each pair of said contact bars with corresponding magnets, said magnets electrically connected with the battery, and means to open and close electrical connection simultaneously through each of said spring bars and its opposing contact bar, substantially as described.

4. In an organ coupler, the combination of a battery, a fresh wind box, pneumatics located in the fresh wind box and communicable therewith, magnets controlling said communication and the exhaust from said pneumatics, spring bars "c" "c'" arranged in pairs, one pair for each key, conductors to electrically connect each of said spring bars with the battery, a switch located in one of said conductors, contact bars "$d$" "$d'$" arranged in pairs, one pair for each key, conductors electrically connecting each of said bars with said magnets respectively, means of opening and closing electrical connection simultaneously between each of said spring bars and its opposing contact bar when a given key is operated, said magnets connected with the battery, substantially as described.

5. In an organ coupler, the combination of contact bars "$d$" "$d'$" provided with independent electrical connections, and a separate contact spring adjacent to but normally out of contact with each of said contact bars, each of said springs provided with an independent electrical connection with an electrical source of supply, a switch to open and close the circuit through one of said electrical connections of the contact springs, and means to simultaneously open and close electrical connections between each of said contact bars and its opposing contact spring, substantially as described.

6. In an organ coupler, contact bars "$d$" "$d'$" provided the one with a main electrical conductor and the other with an independent additional electrical conductor, an independent key actuated spring bar for each of said contact bars to simultaneously open and close electrical connection through each of said contact bars, said spring bars provided the one with a main electrical conductor and the other provided with an independent additional conductor having a switch to open and close electrical connection therethrough, substantially as described.

7. In an organ coupler, a set of independent spring bars, a corresponding set of independent contact bars, electrical conductors connecting the organ action with said contact bars, a battery in circuit with said conductors, electrical conductors independently connecting each of said spring bars with the battery, a key connected with said set of spring bars to simultaneously make and break electrical connection between each of said spring bars and its opposing contact bar, and a switch located in one of the conductors connecting the spring bars with the battery whereby the circuit through one of said spring bars may be opened or closed at the will of the operator while the circuit through the remaining spring bar is closed, substantially as described.

In testimony whereof I sign this specification in the presence of two witnesses.

EDWIN S. VOTEY.

Witnesses:
N. S. WRIGHT,
OTTO B. BARNZIGER.